US007338371B2

(12) United States Patent
Cheng et al.

(10) Patent No.: US 7,338,371 B2
(45) Date of Patent: Mar. 4, 2008

(54) HIGH LOW SERIES GAMBLING GAME

(75) Inventors: Theodore Cheng, San Francisco, CA (US); Mark Nicely, Daly City, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/886,104

(22) Filed: Jul. 6, 2004

(65) Prior Publication Data

US 2005/0032565 A1 Feb. 10, 2005

Related U.S. Application Data

(60) Provisional application No. 60/484,969, filed on Jul. 3, 2003.

(51) Int. Cl.
*A63F 13/00* (2006.01)

(52) U.S. Cl. .......................................................... 463/25

(58) Field of Classification Search .................... 463/9, 463/13, 17, 19, 22, 25
See application file for complete search history.

(56) References Cited

U.S. PATENT DOCUMENTS

| | | | |
|---|---|---|---|
| 3,825,255 | A | 7/1974 | Kennard et al. |
| 4,448,419 | A | 5/1984 | Telnaes |
| 4,624,459 | A | 11/1986 | Kaufman |
| 4,836,546 | A | 6/1989 | Di Re et al. |
| 5,072,946 | A | 12/1991 | Miller |
| 5,154,420 | A | 10/1992 | Gutknecht |
| 5,324,041 | A | 6/1994 | Boylan et al. |
| 5,344,145 | A | 9/1994 | Chadwick et al. |
| 5,524,888 | A | 6/1996 | Heidel |
| 5,647,798 | A | 7/1997 | Falciglia |
| 5,813,673 | A | 9/1998 | Richardson |
| 5,855,514 | A | 1/1999 | Kamille |
| 5,895,047 | A | 4/1999 | Callahan |
| 5,928,081 | A | 7/1999 | Bochichio et al. |
| 5,954,336 | A | 9/1999 | Goossens et al. |
| 5,988,643 | A | 11/1999 | Awada |
| 6,015,346 | A | 1/2000 | Bennett |

(Continued)

FOREIGN PATENT DOCUMENTS

EP 0 281 402 9/1988

(Continued)

OTHER PUBLICATIONS http://www.hardrockcasino.com; How To Play Miss Hi Lo Club; May 12, 2003.

(Continued)

*Primary Examiner*—Kim Nguyen
(74) *Attorney, Agent, or Firm*—Bell, Boyd & Lloyd LLP

(57) ABSTRACT

A game method includes a player placing a wager. A sub-game includes the selection of N challenge indicia from a set of ranked indicia. After each challenge indicia is displayed, a player predicts the relative ranking of the next challenge indicia. If a player qualifies based on his performance during the sub-game, the player is issued a reward and moves to another sub-game. A device for executing a game method includes a data processor communicating with a display, a wager device, a reward dispenser, and a input device.

29 Claims, 8 Drawing Sheets

U.S. PATENT DOCUMENTS

| | | | | |
|---|---|---|---|---|
| 6,033,307 | A | 3/2000 | Vancura | |
| 6,089,976 | A | 7/2000 | Schneider et al. | |
| 6,102,403 | A | 8/2000 | Kaufman | |
| 6,102,798 | A | 8/2000 | Bennett | |
| 6,135,882 | A | 10/2000 | Kadlic | |
| 6,142,874 | A | 11/2000 | Kodachi et al. | |
| 6,142,875 | A | 11/2000 | Kodachi et al. | |
| 6,146,271 | A | 11/2000 | Kudlic | |
| 6,159,095 | A | 12/2000 | Frohm et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,168,523 | B1 | 1/2001 | Piechowiak et al. | |
| 6,174,235 | B1 | 1/2001 | Walker et al. | |
| 6,179,711 | B1 | 1/2001 | Yoseloff | |
| 6,190,255 | B1 | 2/2001 | Thomas et al. | |
| 6,224,483 | B1 | 5/2001 | Mayeroff | |
| 6,231,442 | B1 | 5/2001 | Mayeroff | |
| 6,296,568 | B1 | 10/2001 | Tracy | |
| 6,305,686 | B1 | 10/2001 | Perrie et al. | |
| 6,309,300 | B1 | 10/2001 | Glavich | |
| 6,312,334 | B1 | 11/2001 | Yoseloff | |
| 6,315,660 | B1 | 11/2001 | DeMar et al. | |
| 6,315,664 | B1 | 11/2001 | Baerlocher et al. | |
| 6,322,309 | B1 | 11/2001 | Thomas et al. | |
| 6,398,220 | B1 | 6/2002 | Inoue | |
| 6,425,824 | B1 | 7/2002 | Baerlocher | |
| 6,439,995 | B1 * | 8/2002 | Hughs-Baird et al. | 463/20 |
| 6,506,118 | B1 | 1/2003 | Baerlocher et al. | |
| 6,511,375 | B1 | 1/2003 | Kaminkow | |
| 6,514,141 | B1 | 2/2003 | Kaminkow et al. | |
| 6,565,084 | B1 | 5/2003 | Katz et al. | |
| 6,569,013 | B1 | 5/2003 | Taylor | |
| 6,585,588 | B2 | 7/2003 | Hartl | |
| 6,585,591 | B1 | 7/2003 | Baerlocher et al. | |
| 6,595,854 | B2 | 7/2003 | Hughs-Baird et al. | |
| 6,599,185 | B1 | 7/2003 | Kaminkow | |
| 6,602,135 | B1 * | 8/2003 | Gerrard | 463/16 |
| 6,612,927 | B1 | 9/2003 | Slomiany et al. | |
| 6,634,943 | B1 | 10/2003 | Baerlocher | |
| 6,688,977 | B1 | 2/2004 | Baerlocher | |
| 6,746,328 | B2 | 6/2004 | Cannon et al. | |
| 6,749,502 | B2 | 6/2004 | Baerlocher | |
| 6,761,353 | B2 | 7/2004 | Berman et al. | |
| 6,780,107 | B2 | 8/2004 | Baerlocher et al. | |
| 6,802,775 | B2 | 10/2004 | Baerlocher et al. | |
| 6,808,174 | B1 | 10/2004 | Rubin | |
| 6,926,607 | B2 | 8/2005 | Slomiany et al. | |
| 2002/0135129 | A1 | 9/2002 | Tarantino | |
| 2002/0187827 | A1 | 12/2002 | Blankstein | |
| 2003/0104852 | A1 * | 6/2003 | Duhamel | 463/13 |
| 2003/0153378 | A1 | 8/2003 | Schlegel et al. | |
| 2003/0199297 | A1 * | 10/2003 | Falciglia, Sr. | 463/16 |
| 2004/0102238 | A1 | 5/2004 | Taylor | |
| 2005/0032565 | A1 | 2/2005 | Cheng et al. | |
| 2005/0059448 | A1 | 3/2005 | Sims et al. | |

FOREIGN PATENT DOCUMENTS

| | | | |
|---|---|---|---|
| EP | 0 945 837 | | 9/1999 |
| GB | 2 105 891 | | 3/1983 |
| GB | 2214389 | A | 8/1989 |
| GB | 2 222 712 | | 3/1990 |
| GB | 2 262 642 | A | 6/1993 |
| GB | 2305531 | A | 4/1997 |
| GB | 2 393 022 | A | 3/2004 |
| GB | 2 393 311 | A | 3/2004 |
| GB | 2 401 705 | A | 11/2004 |
| WO | WO 82/01611 | | 5/1982 |
| WO | WO 85/03158 | | 7/1985 |
| WO | WO 97/27569 | | 7/1997 |
| WO | WO 98/00207 | | 1/1998 |
| WO | WO 00/12186 | | 3/2000 |

OTHER PUBLICATIONS http://www.galagames.co.uk;How to Play Flamin Eights; 2002.

Beer Game: High-low description, printed from reelbeer.com (website) on May 3, 2001.

Double Up Poker Game Description written by IGT, available prior to 2000.

High-low card game description, printed from www.geocities.com (website) on Aug. 2, 2004.

High-low card game description, printed from math.hws.edu (website) on Aug. 2, 2004.

In Between Game Description IGT, available prior to 2000.

Multi-Strike Poker Advertisement, written by International Game Technology, published in 2003 and 2004.

Multi-Strike Poker Article in Strictly Slots, published in Sep. 2004.

Price is Right Dice Game Article, printed from gscentral.net/dice.htm website on Jul. 30, 2004.

Price is Right Hi-Lo Article, printed from gscentral.net/hilo.htm website on Jul. 30, 2004.

Roulette Description, Gaming Guide Peppermill Hotel, available prior to 2000.

Run for Your Money Brochure, IGT, 1998.

* cited by examiner

HIGH LOW SERIES GAMBLING GAME

PRIORITY CLAIM

The present application claims the priority of U.S. Provisional Application Ser. No. 60/484,969, entitled "High Low Series Gambling Game," filed Jul. 3, 2003 by Applicants herein.

CROSS-REFERENCE TO RELATED APPLICATIONS

This application relates to the following co-pending, commonly owned applications: "GAMING MACHINE AND METHOD PROVIDING A MULTI-PLAY HIGH-LOW GAME," Ser. No. 11/557,848; and "GAMING DEVICE HAVING MATCH GAME WITH AWARD DETERMINED BY PREDICTION OF CORRECT MATCHES." Ser. No. 10/651,371.

FIELD OF THE INVENTION

The present invention relates to wagering games. Specifically, the present invention is a wagering game in which a player could play a series of sub-games based at least in part on his or her performance in each sub-game.

BACKGROUND OF THE INVENTION

A type of game known in the art is referred to as a "high-low" game. In this game, a player predicts whether the next value in a series of values is higher or lower than the current value. The values are from a known range and may or may not allow for tie values based upon the game.

In one form of this game, the payouts for "higher than" differ from the payouts for "lower than." After each successful "high" or "low" prediction, the player is rewarded. The player must then elect to either cash out or parlay the player's balance into the next prediction using the number used to resolve the successful prediction. After an unsuccessful prediction, the total amount staked and/or parlayed in lost and the game session is concluded. The drawback to this method is that the entire amount staked and/or parlayed rides on a single prediction.

In another form of this game, a player is rewarded after a consecutive series of correct predictions. If, at any point, the player makes an incorrect prediction, the game is concluded and the player's wager is forfeited. This version can be offered in a form wherein the player can decide to collect his award or parlay his reward into a wager to continue the series of predictions. Typically, the reward for any segment of the series remains constant.

In yet another form of these games, a player is rewarded for k or more correct predictions from n possible outcomes, where $k<n$. In this game, the overall outcome is typically pre-determined and the player's prediction affects the next value displayed in order to match the predetermined outcome with the result.

SUMMARY OF THE INVENTION

The present invention is a method for playing a wagering game. The player makes a wager and a series of at least two sub-games are conducted. Within each sub-game, N challenge indicia are selected from a set of ranked indicia. Selected challenge indicia are singly displayed and, after each challenge indicium is displayed, the player predicts the relative ranking of the next subsequent challenge indicium. A determination is made whether the player's predictions were correct.

If the player qualifies based on the results of the sub-game, another sub-game is conducted, optionally at the player's election. In an optional embodiment, a player qualifies by making K correct predictions during the sub-game. Additionally, a reward may be issued to the player based, at least in part, on the player's wager. In an optional embodiment, the reward for any sub-game may be greater than the reward for a preceding sub-game. In another optional embodiment, the player may have the option to add a portion or all the player's earned reward to the wager for a subsequent sub-game. That is, in an optional embodiment, the player's reward may be based on the player's wager plus at least a portion of the player's reward from a preceding sub-game.

If, on the other hand, the player does not qualify, play is terminated as to the player.

In a further optional embodiment, a sub-game may be designated a final sub-game. In such an optional embodiment, if a player qualifies based on the results of the final sub-game, the method includes triggering a final sub-game feature. The final sub-game feature may vary, but in an optional embodiment, the final sub-game feature may include a final sub-game reward, optionally a dynamic reward; a progressive jackpot pay based at least in part on a progressive jackpot pool funded by one or more wagers; a pari-mutuel pay based at least in part on a pari-mutual pool funded by the wagers of the plurality of players; a bonus game; or the like.

In another optional embodiment, the player may have the option of placing a side wager. While the side wager may take many forms, in one optional embodiment, the player may be rewarded on the side wager when one or more selected challenge indicia match one or more predetermined values irrespective of ranking or relative ranking.

Thus, in an optional embodiment, a player places a wager at least two sub-games are conducted. Optionally, the sub-games utilize the same set of ranked indicia. Alternatively, the sub-games utilize different sets of ranked indicia. A first sub-game is conducted in which $N_1$ challenge indicia are selected from the set. The challenge indicia are singly displayed and after each challenge indicium is displayed, the player predicts whether the next subsequent challenge indicium will have a ranking higher or lower than the displayed challenge indicium.

If the player qualifies based on the results of a first sub-game, a second sub-game is conducted. In an optional embodiment, a player qualifies by making $K_1$, correct predictions. Optionally, the second sub-game is substantially similar to the first sub-game utilizing a different set of challenge indicia. Based on the results of at least the first and second sub-games, a reward may be issued to the player based on the player's wager.

A device for conducting a wagering game includes a data processor communicating with a wager device, a reward dispenser, a display, an input device, and a data structure. The data structure stores at least one set of ranked indicia and instructions executable by the data processor. In response to the player making a wager at the wager device, the device of the present invention conducts a series of sub-games. As above, the sub-games include selecting N challenge indicia from the set of ranked indicia and singly displaying the selected challenge indicia at the display. After each challenge indicia is displayed, the data processor receives input from the player at the input device. The input from the player represents the player's prediction of the relative ranking of the next subsequent challenge indicium with respect to the displayed challenge indicium. The data processor determines the results of the player's predictions and if a player qualifies based on the results of the sub-game, a reward is issued to the player at the reward dispenser. Also, the data processor conducts another sub-game. Conversely, if a player fails to qualify based on the results of the sub-game, play by the player is terminated.

DESCRIPTION

Figure 1:
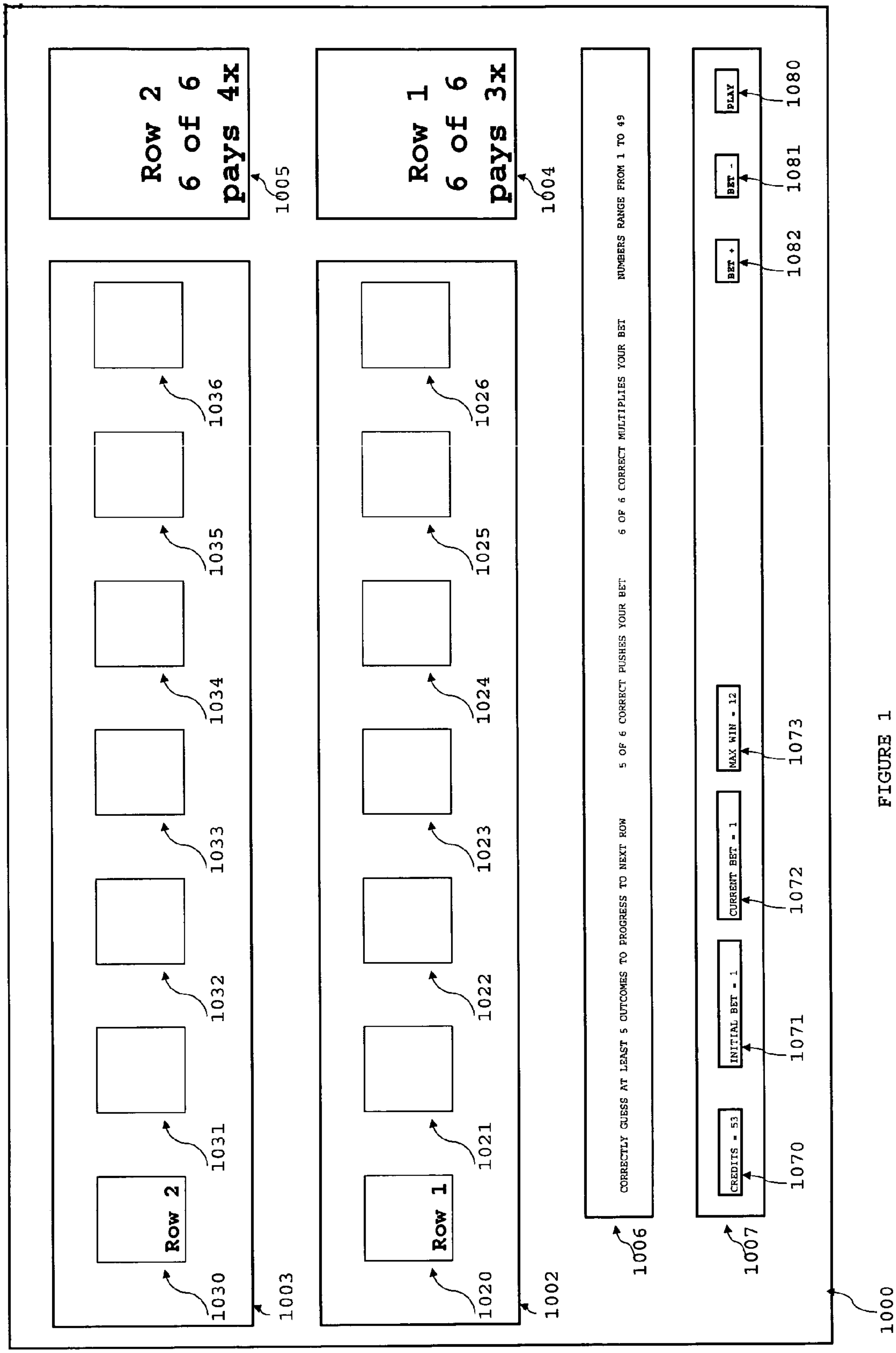
FIG. 1 shows the beginning of a game according to an embodiment of the present invention.

Reference is now made to the figures wherein like parts are referred to by like numerals throughout. Turning first to FIG. 8, the present invention is a method for conducting a wagering game. The game uses a set of ranked indicia. The ranked indicia could be letters, numbers, symbols, playing cards, pictures, or any other indicia that possess, or can be assigned, a relative ranking. The example games of FIGS. 1-7 utilize numerals, but this should be viewed as exemplary rather than limiting.

The purpose of defining a set of ranked indicia is because the player is tasked with selecting or predicting the rank of a subsequent indicium relative to the rank of a displayed indicium. In versions of this game where the same values cannot occur consecutively, the prediction is either HIGHER THAN or LOWER THAN. In versions of this game where the same value can occur twice in a row, there may be multiple ways to structure the player decision including:

1. HIGHER THAN and LOWER THAN
2. HIGHER THAN and LOWER THAN and TIE
3. HIGHER THAN OR EQUAL TO and LOWER THAN
4. HIGHER THAN and LOWER THAN OR EQUAL TO
5. HIGHER THAN OR EQUAL TO and LOWER THAN or HIGHER THAN and LOWER THAN OR EQUAL TO depending upon whether the current number is lower than the median value or higher than the median value.

A player commences play by placing a wager. The method consists of a series of sub-games in which N challenge indicia are selected from a set and each selected challenge indicium is singly displayed. It is noted that the N challenge indicia may be randomly selected and the selection of the N challenge indicia may occur at once or may occur before each challenge indicium is displayed. After each challenge indicium is displayed, the player predicts the relative magnitude of the next value. For example, if the set of ranked indicia are the numbers 1-100, and the challenge indicium is 5, a player would likely predict HIGHER THAN because, it is more likely that the next selected challenge indicium will be between 6 and 100, inclusive, rather than 1 and 4, inclusive.

It is contemplated that the selected challenge indicia may be mutually exclusive, i.e. contain no repeated indicia, or may allow for repeated indicia. That is, in one optional embodiment, it may be possible for the next indicium to be the same as the immediately preceding indicium. That is, it may be possible that a selection is neither "higher than" or "lower than" but is "equal to." As noted above, a player may have the option of selecting "equal to" alone or in combination with "higher than" or "lower than." In another optional embodiment, these options may not be available and a repeated indicium may be an automatically incorrect prediction by the player. In yet another optional embodiment where "equal to" is not available for selection, a repeated indicium may be an automatically correct prediction by the player. In another optional embodiment where "equal to" is not available for selection, the displayed indicium may be redrawn and/or may trigger a special game feature such as a bonus game, jackpot payout, progressive payout, or the like.

In another optional embodiment, it may be possible that repeated indicium are possible but ties, i.e. a displayed indicium matching either an immediately preceding or immediately succeeding indicium, are excluded. In yet another optional embodiment, all repeated indicium may be excluded.

The process of displaying the selected challenge indicium and receiving predictions from the player regarding the relative ranking of the next displayed challenge indicium continues until the sub-game is completed. The sub-game may be completed in a variety of ways. For example, the game method may always display all N selected challenge indicia. In another embodiment, only a subset of the N selected challenge indicia may be displayed. In yet another embodiment, the success of the player may determine how many of the N selected challenge indicia are displayed.

The results of the player's predictions are determined and compared to the performance required to qualify to continue to the next sub-game. Performance could be determined in a number of different ways, but in an optional embodiment, a player must correctly predict K or more outcomes within a sub-game of N selections, where $K \leqq N$, to qualify. Qualifying players may be awarded a prize based at least in part on the player's wager and, optionally, based upon the number of correct predictions.

If a player fails to qualify, play is terminated as to the player. Thus, in the optional embodiment above, if the player incorrectly predicts $N+1-K$ outcomes, the game is terminated and the player forfeits his wager.

Qualifying players also proceed to a subsequent sub-game, although, it is noted that in one optional embodiment, it is contemplated that one sub-game may be designated a final sub-game. In such a final embodiment, a player would not proceed to a subsequent sub-game but would be eligible to trigger a final sub-game feature, as described in greater detail below.

Assuming, however, that the sub-game completed is not a final sub-game, a qualifying player would proceed to another sub-game. Thus, in the preceding example, if the player successfully predicts K or more outcomes in one sub-game the player may proceed to the next sub-game. In one optional embodiment, the player automatically moves on and in another embodiment, the player is given the option of collecting his prize and ending the game or parlaying all or a portion of his reward as a new wager for the next sub-game.

It is noted that the mechanics of starting a subsequent sub-game could vary. for example, the first challenge indicium in a sub-game could be randomly selected or it could be the last value from the previous sub-game.

In one optional embodiment, the subsequent sub-game is substantially similar to the preceding sub-game. However, it is contemplated that the sub-games could differ. For example, the sets of ranked indicia and/or the size of the sets of ranked indicia may differ or may remain the same; the number of selections, N, could differ or could remain the same; or the quantity of correct predictions required for qualification, K, could differ or could remain the same.

In particular, it is contemplated that the reward may differ from sub-game to sub-game in an optional embodiment. For example, as a player moves to a subsequent sub-game, the size of the reward may increase. Thus, in such an optional embodiment, the reward for any sub-game may be higher than the reward for a preceding sub-game. It should be noted, however, that this is not critical to the present method and the relative size of each reward may be selected or determined using any criteria.

Not only could the size of the reward change with the sub-game, but the size of the reward could be static, that is selected from a predetermined paytable, or dynamic, that is based on a distribution of possible rewards. Moreover, payouts could be used to increment a bonus counter that may trigger a bonus round upon reaching a predetermined value.

Similarly, the reward could be a progressive jackpot funded by a progressive pool. The progressive pool may, in turn, be funded by the initial wagers, the amount wagered as subsequent sub-games are entered, or a combination of both. A progressive jackpot could be offered on all sub-games or only certain sub-games, and may optionally require a special trigger, such as a series of consecutive correct predictions, a series of repeated challenge indicia, i.e. ties, completion of a predetermined quantity of sub-games, a random selection from a series of possible rewards, or the like.

Likewise, a reward may be funded through a pari-mutual pool. A pari-mutual pool would include pooling at least a portion the wagers from multiple players, such as those playing over a computer network.

As noted above, one sub-game could be designated a final sub-game. Completion of the final sub-game could trigger a final sub-game feature. This feature could simply be a final sub-game payout. Optionally the final sub-game payout is dynamic based on the performance of the player in the preceding sub-games. It is noted that the performance need not be extraordinary for the final sub-game payout to be altered. For example, in a game requiring K or more correct predictions to advance to the subsequent sub-game where K<N, but obtaining exactly K correct predictions only results in the player receiving his original wager, a final sub-game reward could be enhanced for a player getting exactly K correct predictions on each sub-game. In another optional embodiment, the final sub-game payout is a pari-mutual payout.

In another optional embodiment, the final sub-game payout is a progressive jackpot. In an alternate embodiment, completing a final sub-game may contribute to a progressive jackpot counter and, if the player's contribution causes the progressive jackpot counter to exceed a predetermined value, the player may be awarded the progressive jackpot. Thus, not every player who completes the final sub-game will automatically receive a progressive jackpot, but only those who, by chance, cause the progressive jackpot counter to trigger the progressive jackpot.

In another optional embodiment, completion of the final sub-game may trigger a bonus game. Again, an alternate embodiment may include contributing to a bonus accumulator upon completion of a final sub-game. If the bonus accumulator is caused to exceed a predetermined value as a result of the contribution, the bonus game is triggered.

As an additional feature, an optional side wager may optionally be offered. In one optional embodiment, side wagers are resolved using one or more challenge indicia matching a predetermined value or range regardless of the relative ranking. For example, side wagers could be offered on the total sum of the challenge indicia, the number of even vs. odd challenge indicia, or the like.

The block diagram of FIG. 8 illustrates one optional embodiment of the game method. The player starts the game 810, which may have involved player choosing a starting wager amount (not shown). A challenge indicium is randomly selected from the ranked indicia set and displayed 815 and the player predicts whether the next value will be higher or lower 820 than the displayed challenge indicium. Another challenge indicium is chosen and displayed 825 and the rank is compared to the initial challenge indicium 830.

In this optional embodiment, if the prediction was correct 830 then play continues. If the prediction is incorrect 830 and the total number of incorrect predictions for the sub-game exceed a predetermined number 835, the bet is forfeited 840 and play is terminated 845. If the prediction was incorrect 830 and the total number of incorrect predictions for the sub-game has not exceed a predetermined number, the play continues 850.

The process of displaying a challenge indicium, receiving a player prediction, and comparing the rank of the displayed challenged indicium to a subsequent challenge, and evaluating the prediction, is repeated until the sub-game is completed. In the optional embodiment of FIG. 8, the sub-game is completed when the player exceeds a predetermined number of incorrect predictions or when the player has completed the last prediction in the sub-game, represented in this case as a row 850.

Upon completing a row, the player's reward is determined. As noted above, this could be calculated in any number of ways, but in the optional embodiment of FIG. 8, the reward is based upon the correct number of predictions and a multiplier for the given row 855. For example, in the examples for FIGS. 1-6, five correct predictions out of six total predictions returns the previous wager while six of six correct predictions pays out based upon the row: for the first row, the winnings are three times the current wager while for the second row, the winnings are four times the current wager. If the player has played the last available row, then the players winnings are paid to the player 865 and the game is completed. Otherwise, the player may be given the option 880 to collect his reward 885 and end the game, or to play the next sub-game 895. If the player opts to play another sub-game, the player may be required or may be given the option to parlay any reward into the wager for the subsequent sub-game.

Referring to FIG. 1, a starting state 1000 comprised of two sub-games is illustrated. The lower row represents a first sub-game 1002 and the upper row represents a second sub-game 1003, each of which has its own payout display 1004, 1005. It should be noted that in this optional embodiment, all of the rows representing sub-games are simultaneously displayed. However, it is contemplated that each sub-game may appear sequentially as play progresses. Each sub-game includes an area for the starting value 1020, 1030 and area for all of the new values 1021-1026, 1031-1036. A qualifying player within a sub-game, is shown a payout for the second sub-game 1003 in a status area 1005 and the payout for the initial sub-game 1002 is displayed in its corresponding status area 1004. Optionally, the payout for the second sub-game is greater than the payout for the second sub-game. The game can also contains a messaging area 1006 and a player information and user control area 1007, which includes information displays 1070-1073 and user input buttons 1080-1081.

Figure 2:
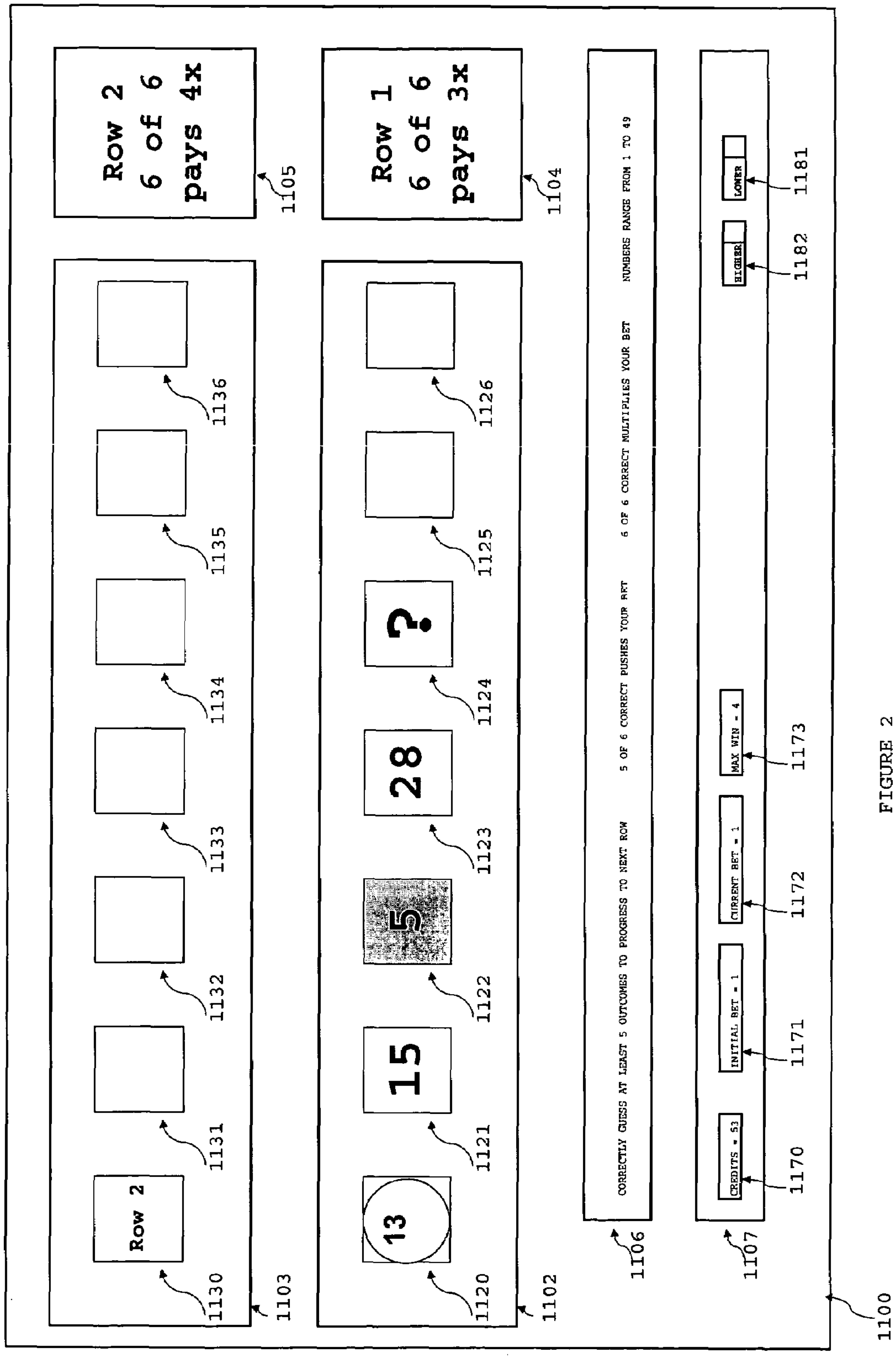
FIG. 2 shows a game in progress during a first sub-game according to an embodiment of the present invention.
Figure 3:
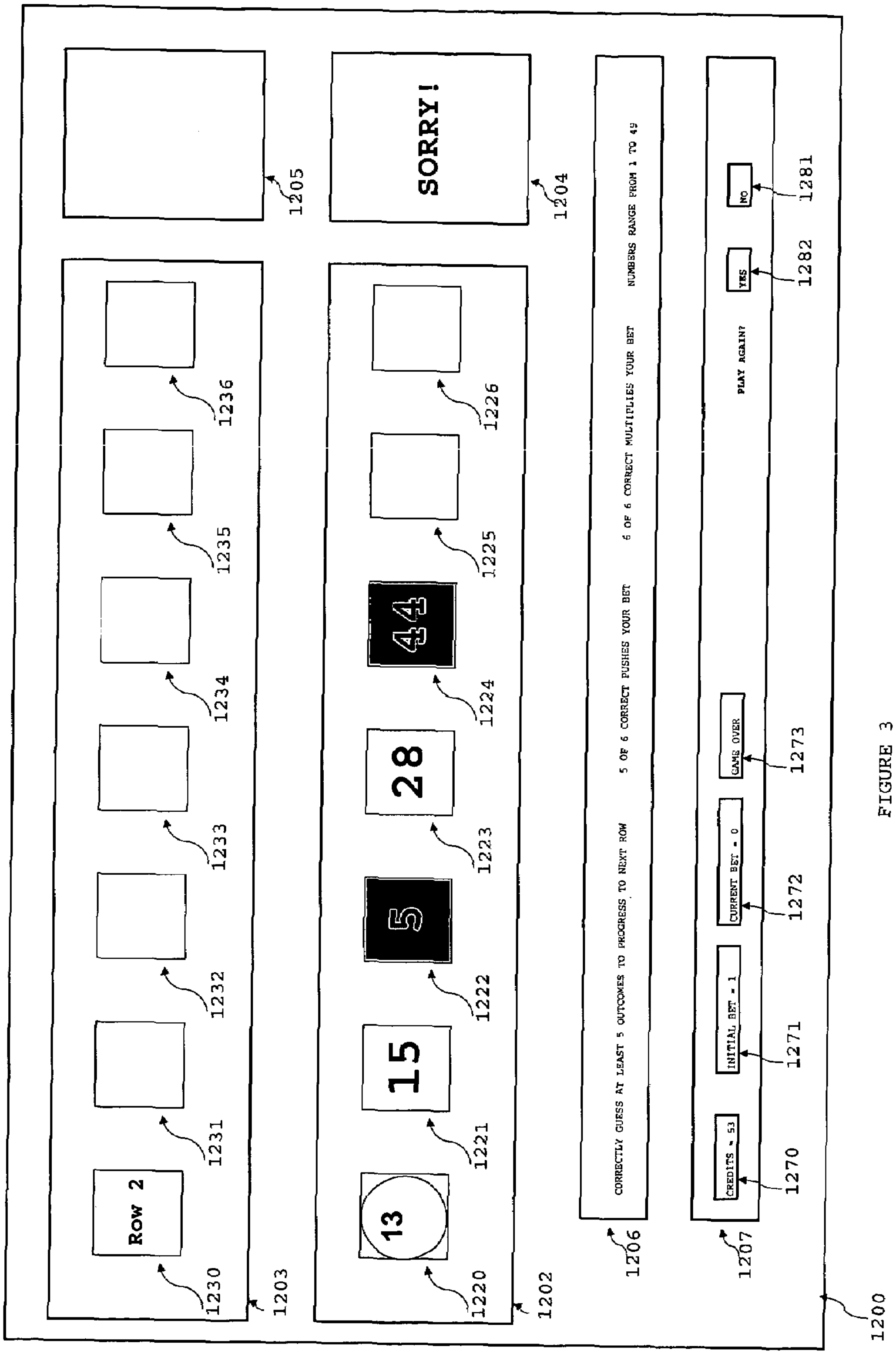
FIG. 3 shows the game of FIG. 2 at the end of a first sub-game.

Turning to FIG. 2, a possible game based upon FIG. 1 is shown in progress. In this example, the initial challenge indicia is the numeral "13." The player has correctly predicted two outcomes 1121, 1123 and incorrectly predicted one outcome 1122. In this optional embodiment, the player has only one incorrect prediction and he is able to continue playing. The player makes his next prediction by depressing the HIGHER button 1182 or the LOWER button 1181. It is noted that this optional embodiment utilizes a dynamic paytable. Specifically, the display 1173 shows that the possible payout has dropped from a value of twelve in FIG. 1 to a value of four reflecting the fact that for this game round, the player has already one incorrect prediction and, therefore, can only win four by correctly predicting all rankings up through the final prediction.

In the optional embodiment of the figures, the sub-game of FIG. 2 may be terminated if the player exceeds a predetermined number of incorrect predictions. That is, in FIG. 3, the player has incorrectly predicted a second prediction on the same sub-game 1224, thus ending his game.

Figure 4:
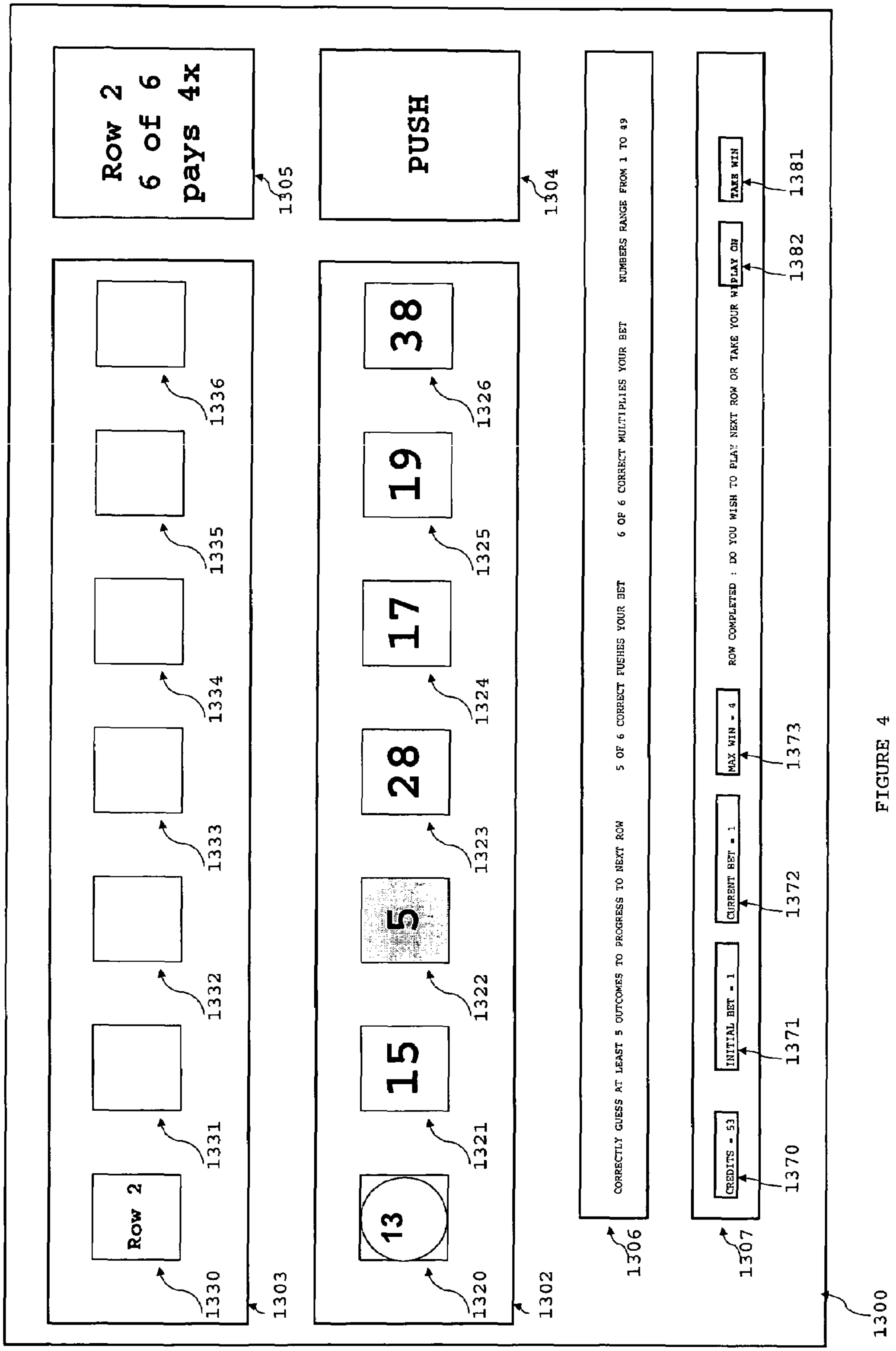
FIG. 4 shows an alternate outcome for the game of FIG. 2 at the end of a first sub-game.

FIG. 4, however, illustrates the sub-game of FIG. 2 where the player has completed the sub-game by correctly predicting the relative rankings of the remaining predictions 1324-1326 and, thus, has obtained a performance of five correct predictions out of six total predictions. In this optional embodiment, the player is given the choice to play the next sub-game 1303 or to collect his current stake 1372 via control buttons 1382 and 1381. As noted above, in this optional embodiment, if he chooses to play on, the player will now have the opportunity at a second reward for a second sub-game that is greater than the first reward issued for a first sub-game.

Figure 5:
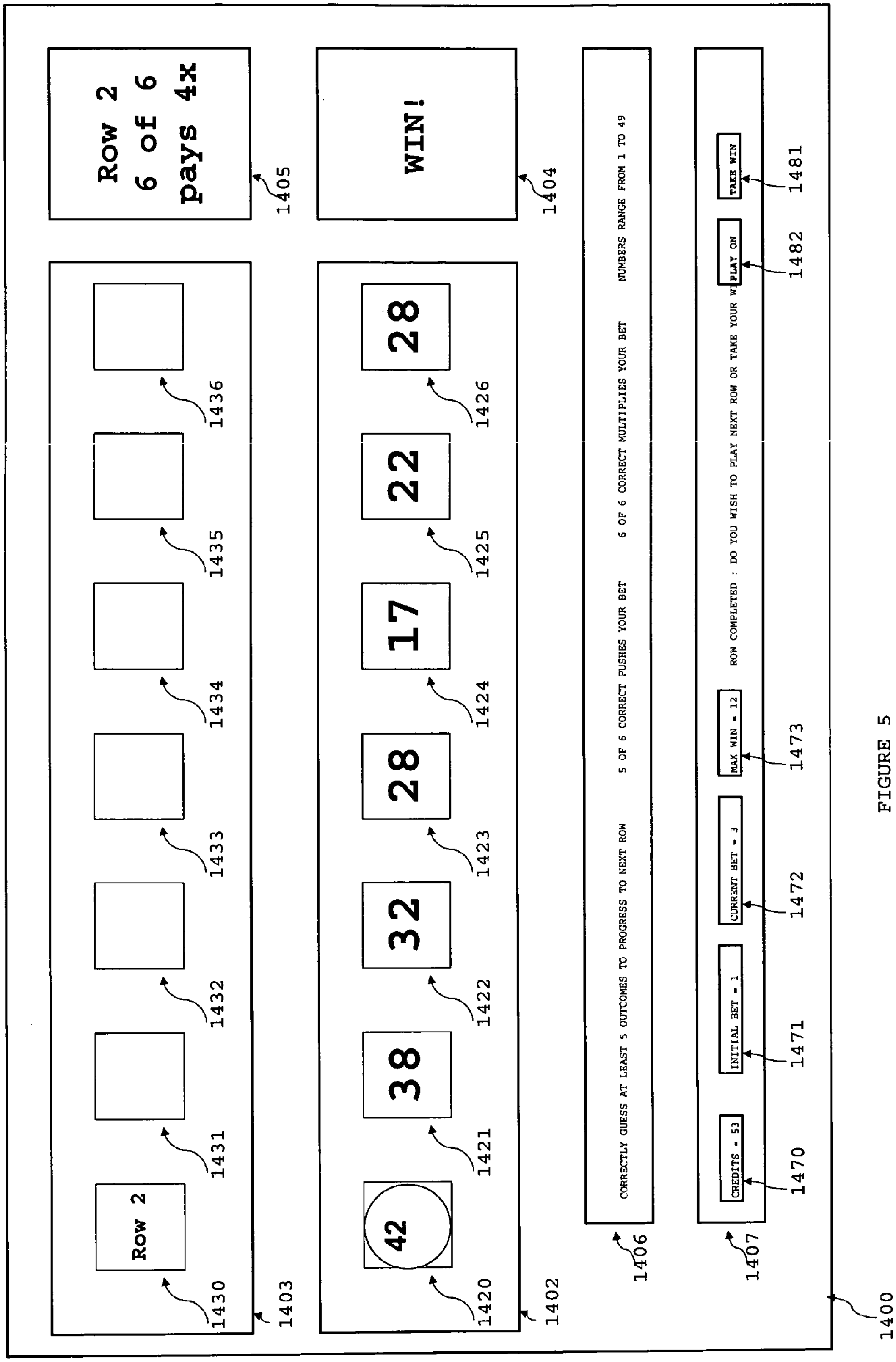
FIG. 5 shows a game in progress at the end of a first sub-game according to an embodiment of the present invention.

Another example game is shown in FIG. 5. In this example game, the player has correctly predicted all six relative rankings 1421-1426 in the first sub-game represented in the first row 1402. The player is rewarded and he is then given the choice to play the next sub-game, represented by the next row 1403, or to collect his current stake 1472 via control buttons 1482 and 1481. Again, in this optional embodiment, the player now has the opportunity to play a second sub-game for a second reward that is greater than the first reward for a first sub-game.

Figure 6:
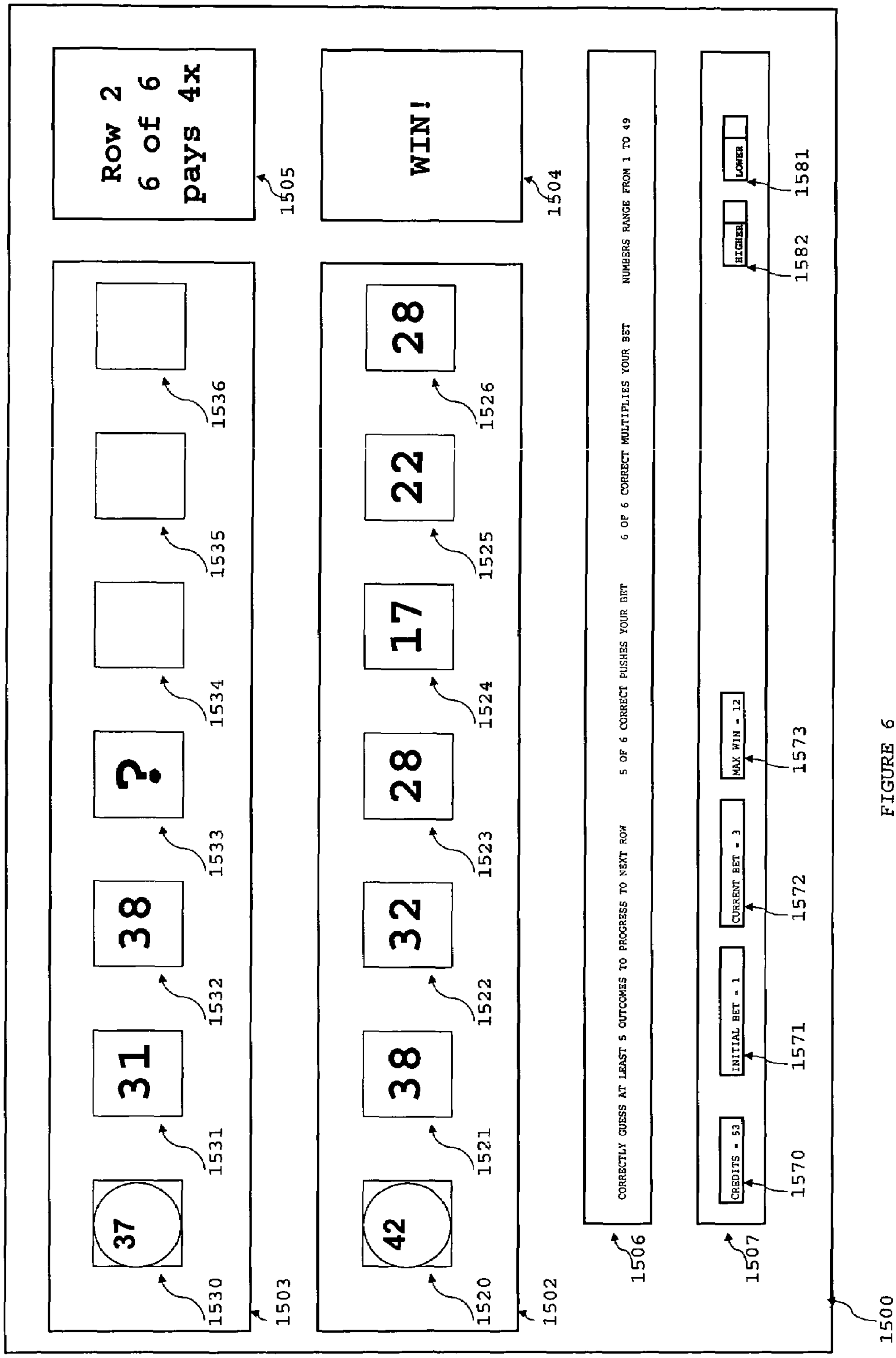
FIG. 6 shows the game of FIG. 5 in progress during a second sub-game.

One possible continuation of the game of FIG. 5 is shown in FIG. 6. In this example, the player has opted to parlay his win from a first sub-game 1502 and is now playing through a second sub-game 1503.

Figure 7:
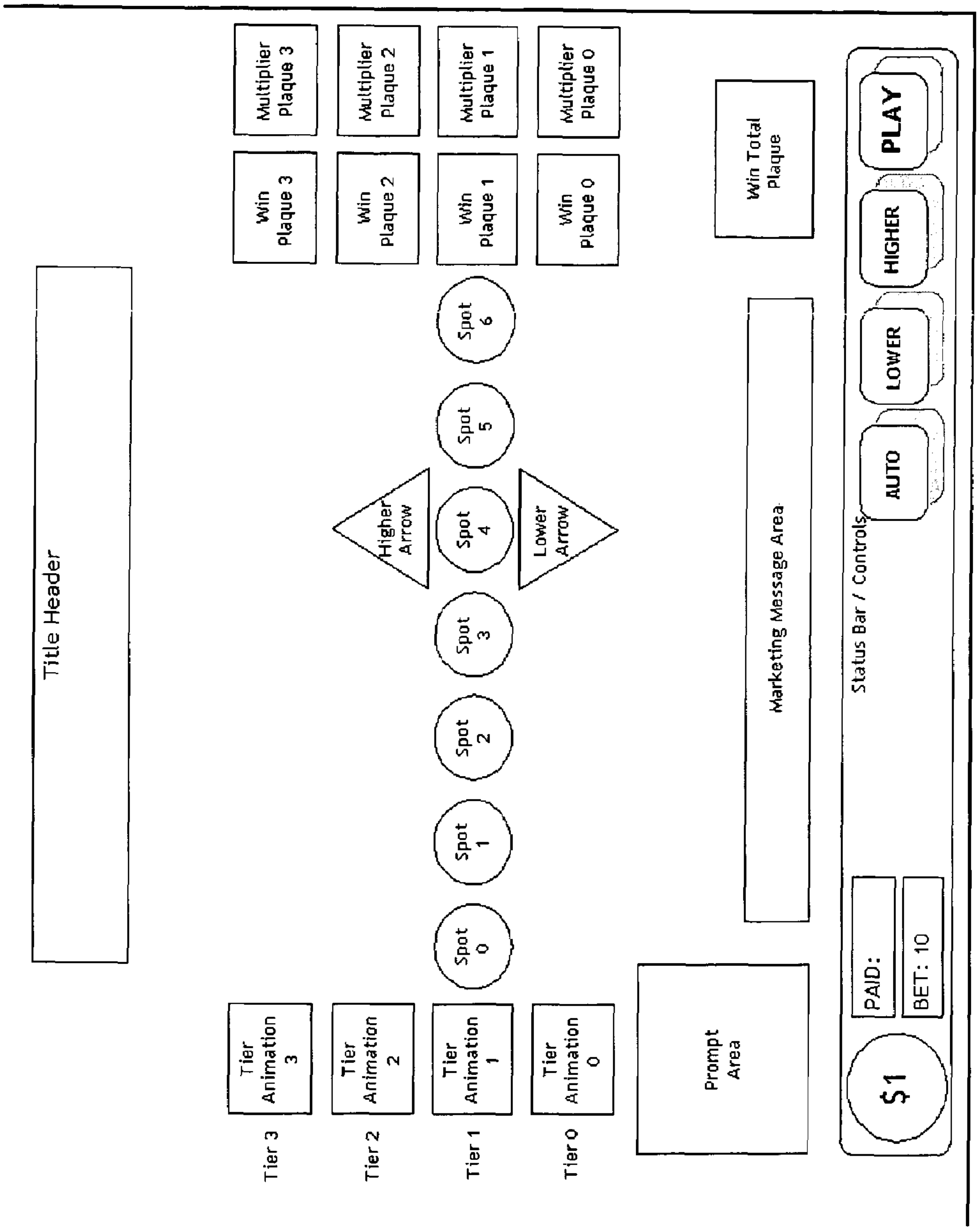
FIG. 7 shows a game display for an embodiment of a game according to an embodiment of the present invention.
Figure 8:
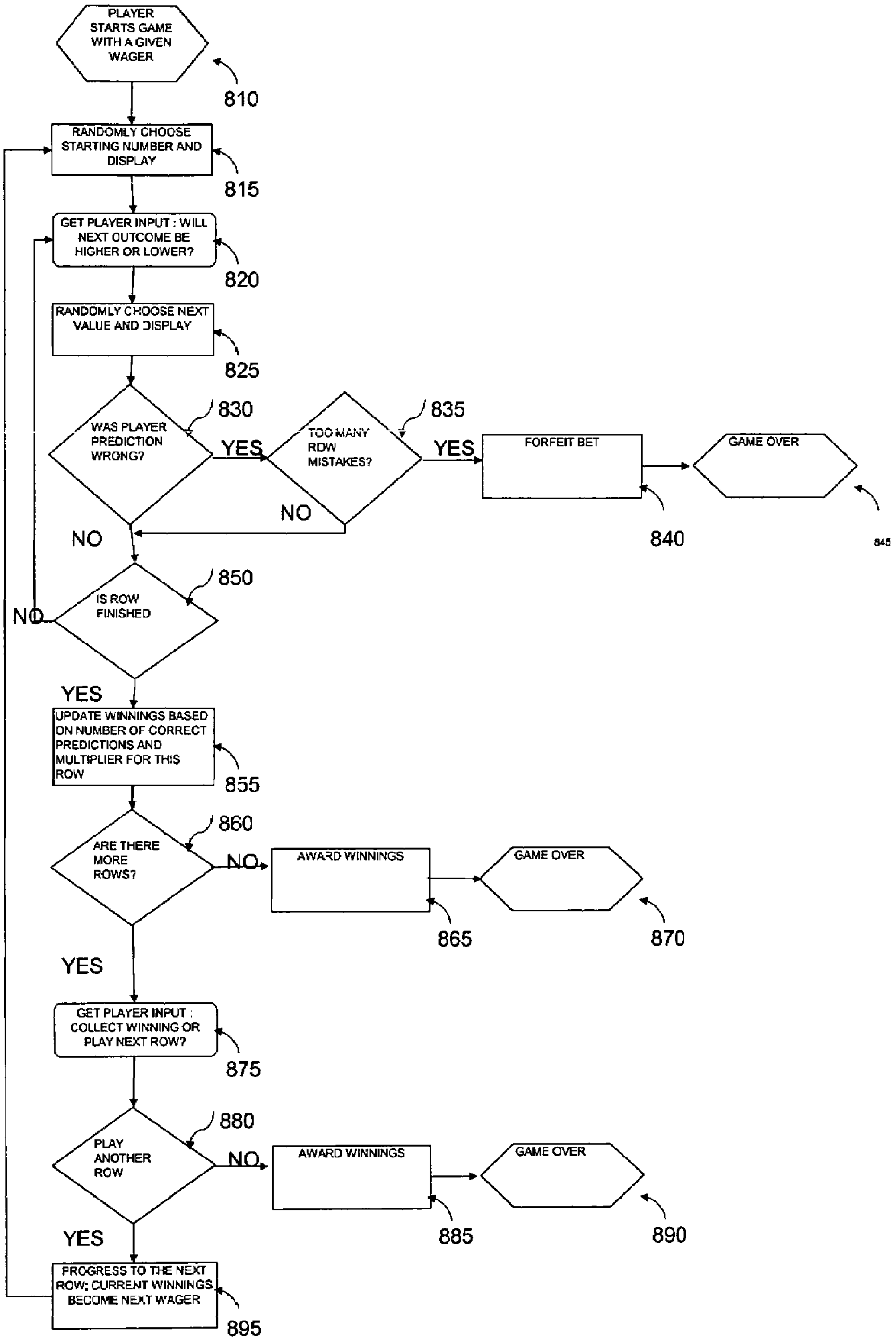
FIG. 8 shows a flowchart of a method according to an embodiment of the present invention.

Another possible layout for a game method according to the present invention is illustrated in FIG. 7. In this optional embodiment, four rows, representing four sub-games, each require the player to make up to six predictions.

A device according to the present invention is shown in FIG. 9. A device for conducting a wagering game includes a data processor 300. The data processor 300 may take any form including a specific use computer or a general purpose computer. The data processor 300 communicates with a wager device 302. In a gaming machine, the wager device could be a coin or token receiver, a bill acceptor, a card reader, or the like. In a kiosk or Internet embodiment, the wager device 302 could be a card reader or keyboard for inputting account information. The data processor 300 also communicates with a reward dispenser 304 and a display 306. Additionally, an input device 308, such as a touch screen, controller, keypad, control button, or the like, communicates with the data processor 300.

A data structure 310, storing at least one set of ranked indicia and instructions executable by the data processor 300, also communicates with the data structure 310. In response to the player making a wager at the wager device 302, the data processor 300 conducts a of sub-games.

As described previously, a sub-game includes the selection of N challenge indicia from the set of ranked indicia and singly displaying the selected challenge indicia at the display 306. After each challenge indicia is displayed, the player inputs at the input device 308 his or her prediction of the relative ranking of the next subsequent challenge indicium with respect to the displayed challenge indicium. The data processor 300 receives the input at the input device 308 from the player and determines the results of the player's predictions. If a player qualifies based on the results of the sub-game, a reward is issued to the player at the reward dispenser 304 and the data processor 300 conducts another sub-game. If, on the other hand, a player fails to qualify based on the results of the sub-game, play by the player is terminated.

While certain embodiments of the present invention have been shown and described it is to be understood that the present invention is subject to many modifications and changes without departing from the spirit and scope of the claims presented herein.

We claim:

1. A method for operating a wagering game comprising:

enabling a player to provide a wager;

providing an opportunity for the player to play a series of sub-games based on the wager, each one of the sub-games being a part of the wagering game, wherein, for a play of at least a first one of the sub-games, the providing step comprises:

(a) selecting at least a first, a second and a third challenge indicium from a set of ranked indicia;

(b) singly displaying each one of the first and second selected challenge indicia;

(c) after each one of the first and second challenge indicium is displayed, enabling the player to predict a relative ranking of a subsequent challenge indicium with respect to said displayed challenge indicium; and (d) displaying the third selected challenge indicium after the prediction is received for the third selected challenge indicium;

determining whether each one of the player's predictions is a correct prediction or an incorrect prediction;

determining a performance based on how many of the correct predictions occur in comparison to how many of the incorrect predictions occur; and determining whether to repeat steps (a) through (d) for a play of a second one of the sub-games, wherein said determination is based, at least in part, on the performance which has at least one incorrect prediction.

2. The method of claim 1 which includes associating a first reward with the first sub-game and associating a second reward with the second sub-game, the second reward being greater than the first reward.

3. The method of claim 2 further comprising:

enabling said player to provide an optional side wager, and rewarding said player based on said side wager when one or more selected challenge indicia match one or more predetermined values irrespective of ranking or relative ranking.

4. The method of claim 2 which includes enabling the player to parlay at least a portion of the first reward into the wager for the second sub-game.

5. The method of claim 4 which includes associating a first reward with the first sub-game and issuing at least a portion of the first reward to the player for the second sub-game.

6. The method of claim 1 which includes a reward issued to said player for the first or second sub-game, the reward being based solely on the player's wager.

7. The method of claim 1 further comprising:

designating at least one of the sub-games as a final sub-game; and if the player qualifies based on the results of said final sub-game, triggering a final sub-game feature.

8. The method of claim 7 wherein said final sub-game feature is a final sub-game reward.

9. The method of claim 8 wherein said final sub-game reward is based on a distribution of possible rewards.

10. The method of claim 7 wherein said final sub-game feature is a progressive jackpot pay based at least in part on a progressive jackpot pool funded by one or more wagers.

11. The method of claim 10 wherein said final sub-game feature comprises:

contributing to a progressive jackpot pool; and conducting a progressive jackpot mechanism to award said progressive jackpot pay.

12. The method of claim 7 wherein said game method is conducted over a computer network for a plurality of players, said final sub-game feature being a pari-mutual pay based at least in part on a pari-mutual pool funded by the wagers of said plurality of players.

13. The method of claim 7 wherein said final sub-game feature is a bonus game.

14. The method of claim 13 wherein said final sub-game feature comprises: contributing to a bonus accumulator, said bonus game initiated upon the bonus accumulator reaching a predetermined level.

15. A method for operating a wagering game comprising:

enabling a player to provide a wager;

conducting a first play of the wagering game based on the wager, the conducting step comprising:

(a) selecting at least a first, a second and a third challenge indicia from a first set of ranked indicia;

(b) singly displaying each one of the first and second selected challenge indicia;

(c) after each one of the first and second challenge indicium is displayed, enabling the player to predict whether a subsequent challenge indicium will have a ranking higher or lower than said displayed challenge indicium; and (d) displaying the third selected challenge indicium after the prediction is received for the third selected challenge indicium;

determining whether each one of the player's predictions is a correct prediction or an incorrect prediction;

determining a performance based on how many of the correct predictions occur in comparison to how many of the incorrect predictions occur; and determining whether to repeat steps (a) through (d) for a second play of the wagering game, the second play being based, at least in part, on the wager, wherein said determination is based, at least in part, on the performance which has at least one incorrect prediction.

16. The method of claim 15 which includes terminating the wagering game depending upon the performance.

17. The method of claim 16 wherein said first set and said second set are the same.

18. The method of claim 15 wherein the condition is met after: (a) at least two predictions have been made; and (b) it has been determined that a greater percentage of said predictions are correct predictions versus incorrect predictions.

19. A method for operating a wagering game comprising:

enabling a player to provide a wager;

conducting at least a first sub-game of the wagering game, the conducting step comprising:

(a) randomly selecting at least a first, a second and a third challenge indicia from a set of ranked indicia;

(b) displaying the first selected challenge indicium;

(c) after the first selected challenge indicium is displayed, enabling the player to predict whether the second selected challenge indicium will have a ranking higher or lower than the first displayed selected challenge indicium, the player's prediction being correct or incorrect;

(d) displaying the second selected challenge indicium; and (e) after the second selected challenge indicium is displayed, enabling the player to predict whether the third selected challenge indicium will have a ranking higher or lower than the second displayed selected challenge indicium, wherein the player is enabled to provide said prediction regardless of whether the player's prediction of the second selected challenge indicium was correct or incorrect; and determining whether to repeat steps (a) through (e) for a play of a second sub-game of the wagering game, wherein said determination is based, at least in part, on the player's predictions.

20. The method of claim 19 which includes associating a first reward with the first sub-game and associating a second reward with the second sub-game, wherein each one of the first and second rewards is based, at least in part, on the wager.

21. The method of claim 19 wherein the condition is met after: (a) at least two predictions have been made; and (b) it has been determined that a greater percentage of said predictions are correct predictions versus incorrect predictions.

22. A gaming device comprising:

a display device;

at least one input device;

a data storage device; and a processor operatively coupled to the display device, the at least one input device and the data storage device, the processor being programmed to:

(a) receive an input from a player, the input corresponding to a wager;

(b) conduct at least a first sub-game of a wagering game based on the wager, the conduct step comprising:

(i) producing at least a first, a second and a third challenge indicium from a first set of ranked indicia;

(ii) causing the display device to singly displaying each one of the first and second produced challenge indicia;

(iii) after each one of the first and second challenge indicium is displayed, enabling the player to predict whether a subsequent challenge indicium will have a ranking higher or lower than said displayed challenge indicium; and (iv) causing the display device to display the third challenge indicium after the prediction is received for the third challenge indicium; and (c) determine whether each one of the player's predictions is a correct prediction or an incorrect prediction;

(d) determine a performance based on how many of the correct predictions occur in comparison to how many of the incorrect predictions occur; and (e) determine whether to repeat steps (i) through (iv) for a play of a second sub-game of the wagering game, wherein said determination is based, at least in part, on the performance which has at least one incorrect prediction.

23. The gaming device of claim 22 which includes associating a first reward with the first sub-game and associating a second reward with the second sub-game, wherein each one of the first and second rewards is based, at least in part, on the wager.

24. The gaming device of claim 22 wherein the condition is met after: (a) at least two predictions have been made; and (b) it has been determined that a greater percentage of said predictions are correct predictions versus incorrect predictions.

25. A gaming device comprising:

a display device;

at least one input device;

a data storage device;

a processor operatively coupled to the display device, the at least one input device and the data storage device, the processor being programmed to:

(a) receive an input from a player, the input corresponding to a wager;

(b) conduct at least a first play of a wagering game based on the wager, the conduct step comprising:

(i) producing at least a first, a second and a third challenge indicium from a first set of ranked indicia;

(ii) causing the display device to singly display each one of the first and second produced challenge indicia;

(iii) after each one of the first and second challenge indicium is displayed, enabling the player to predict whether a subsequent challenge indicium will have a ranking higher or lower than said displayed challenge indicium; and (iv) causing the display device to display the third challenge indicium after the prediction is received for the third challenge indicum;

(c) determine whether each one of the player's predictions is a correct prediction or an incorrect prediction;

(d) determine a performance based on how many of the correct predictions occur in comparison to how many of the incorrect predictions occur; and (e) determine whether to repeat steps (i) through (iv) for a second play of the wagering game, the second play being based, at least in part, on the wager, wherein said determination is based, at least in part, on the performance which has at least one incorrect prediction.

26. A device operable upon a wager, the device comprising:

a data processor;

a display operatively coupled to said data processor;

an input device operable by a player and operatively coupled to said data processor;

a wagering game providing the player with an opportunity to play a plurality of sub-games of the wagering game;

a plurality of computer-readable instructions executable by said data processor, for a play of at least a first one of the sub-games, to:

(I) conduct a plurality of steps comprising:

(a) causing a selection of at least a first, a second and a third challenge indicium from a set of ranked indicia, (b) causing the display to display the first selected challenge indicia, (c) after the first selected challenge indicium is displayed, receiving an input from said player at said input device to receive a prediction of a relative ranking of the second selected challenge indicium with respect to the first selected challenge indicium, (d) causing the display device to display the second selected challenge indicium so as to indicate whether the prediction for the second selected challenge indicium is correct or incorrect, (e) after the second selected challenge indicum is displayed, receiving an input from said player at said input device to receive a prediction of a relative ranking of the third selected challenge indicium with respect to the second selected challenge indicium, said prediction being received regardless of whether the prediction of the second selected challenge indicium was correct or incorrect, and (f) causing the display device to display the third selected challenge indicium so as to indicate whether the prediction for the third selected challenge indicium is correct or incorrect; and (II) determine whether to repeat steps (a) through (f) for a play of a second one of the sub-games of the wagering game, wherein said determination is based, at least in part, on the player's predictions.

27. A gaming system comprising:

enabling a player to provide a wager;

conducting one or more plays of a wagering game, a first one of the plays comprising:

(a) providing a set of ranked indicia;

(b) selecting at least a first, a second and a third challenge indicium from said set;

(c) singly displaying the second and third selected challenge indicia;

(d) after each one of the second and third challenge indicia is displayed, enabling the player to predict a relative ranking of a next subsequent challenge indicium with respect to said displayed challenge indicium, the player being enabled to provide the prediction for the third challenge indicium regardless of whether the prediction for the second challenge indicium is incorrect; and determining whether to repeat steps (a) through (d) for a second play of the wagering game, the second play being based, at least in part, on the wager, wherein said determination is based, at least in part, on the player's predictions.

28. The gaming system of claim 27 which includes associating a first reward with the first play and associating a second reward with the second play, wherein each one of the first and second rewards is based, at least in part, on the wager.

29. The gaming system of claim 27 wherein the condition is met after: (a) at least two predictions have been made; and (b) it has been determined that a greater percentage of said predictions are correct predictions versus incorrect predictions.

* * * * *